United States Patent Office 2,769,008
Patented Oct. 30, 1956

2,769,008

NITROGEN CONTAINING CARBINOLS

Walter Reppe and Heinrich Pasedach, Ludwigshafen (Rhine), Erich Dreher, Ludwigshafen, Rhine-Oppau, and August Amann, Ludwigshafen (Rhine), Germany, assignors to Badische Anilin- & Soda-Fabrik Aktiengesellschaft, Ludwigshafen (Rhine), Germany No Drawing. Application March 22, 1954, Serial No. 417,942

Claims priority, application Germany March 24, 1953

6 Claims. (Cl. 260—294.7)

This invention relates to valuable nitrogen containing carbinols and to improved methods for producing them.

We have found that valuable nitrogen containing carbinols of the general formulae

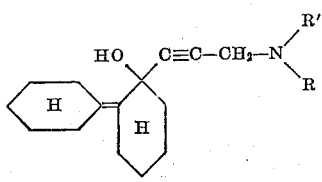

and

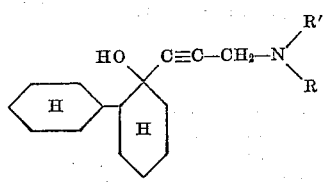

wherein —NRR' is the radical of a secondary amine are readily obtained by reacting 2-cyclohexyl- or 2-cyclohexylidene-cyclohexanone with an aminopropine in the presence of ethinylation catalysts.

Aminopropines especially suitable for the production of the new nitrogen containing carbinols are the 1-diethylaminopropine-(2), the 1-pyrrolidinopropine-(2), the 1-piperidinopropine-(2) and the 1-piperidyl-1-methylpropine-(2); other aminopropines obtainable according to the process described in German patent specifications No. 724,759 and 730,850 by condensing aldehydes, such as formaldehyde, acetaldehyde, propionaldehyde, benzaldehyde, phenylacetaldehyde or cyclohexylaldehyde, with acetylene and with secondary amines. As secondary amines we prefer fully saturated dialkylamines or polymethylene imines, these amines containing between 2 and 6, preferably 2 and 5 carbon atoms. Representative are dimethylamine, diethylamine, methyl ethyl amine, methyl propyl amine, pyrrolidine, piperidine or morpholine.

Instead of reacting 2-cyclohexyl- or 2-cyclohexylidene-cyclohexanone with said aminopropines, it is also possible to react first said ketones with acetylene in the presence of ethinylation catalysts and then the ethinyl carbinols so obtained with aldehydes and said secondary amines under conditions customary for the so-called Mannich-Reactions.

Suitable ethinylation catalysts are, for example alkali metal hydroxides, amides or alcoholates, strong organic bases, such as piperidine, or heavy metals of the first group of the periodic system, such as copper or silver, and their acetylides and compounds capable of forming acetylides. Mixtures of two or more of these catalysts may also be used.

The ethinylation reactions generally speaking take place rapidly even at room temperature; sometimes heating is necessary and in other cases the reaction must be moderated by cooling. The co-employment of indifferent solvents or diluents, such as ether, tetrahydrofurane, dioxane or acetals, is advantageous.

The basic carbinols obtainable according to the above described process which still contain the acetylene triple linkage and may also contain the cyclohexylidene double linkage, may be used as such or may be completely or partly hydrogenated by the usual methods, as for example by the aid of Raney-iron to the propylene derivatives or by the aid of Raney-nickel to the wholly saturated compounds.

The nitrogen containing carbinols accessible according to the said process readily and in excellent yields from cheap commercial initial materials have valuable spasmolytic properties, similar to atropine, either as such or in the form of their ammonium salts. We prefer to use the ammonium halides derived from the amines by the reaction with hydrogen chloride, bromide or iodide or the corresponding esters thereof with low molecular fatty alcohols, e. g. methanol, ethanol or propanol. Some of them are especially effective as remedies for use against Parkinson's disease.

It is already known that 2-cyclohexylidene- and 2-cyclohexyl-1-(3'-piperidinopropyl)-cyclohexanol and their salts have properties similar to atropine and are useful as remedies against Parkinson's disease. Hitherto it has only been possible to prepare these two basic carbinols by the reaction of N-(1-halogenopropyl-(3)-)piperidine with a metal such as magnesium, cadmium or zinc, and then with 2-cyclohexylidene- or 2-cyclohexyl-cyclohexanone (see the U. S. patent specification No. 2,590,638). As compared with this, the present process is much simpler and cheaper and moreover more generally applicable.

The following examples will further illustrate this invention but the invention is not restricted to these Examples. The parts are parts by weight.

*Example 1*

A solution of 55 parts of 1-piperidinopropine-(2) in 80 parts of 2-cyclohexylidene-cyclohexanone is allowed to flow gradually at room temperature while stirring into a mixture of 300 parts of tetrahydrofurane, 80 parts of finely powdered potassium hydroxide and 35 parts of sodium methylate. The reaction mixture thus warms up to about 35° C. It is stirred further for about 16 hours and then 100 parts of water are added and the aqueous alkaline layer which settles out is separated. The organic layer is dried with solid caustic alkali. The solvent is then distilled off and unchanged 1-piperidinopropine-(2) (about 9 parts) is distilled off under reduced pressure.

The residue which remains (about 121 parts) is stirred with about 10 percent hydrochloric acid until the solution is acid to congo. The resulting aqueous solution which is clouded by unreacted 2-cyclohexylidene-cyclohexanone is shaken with ether; after evaporating the ether, 12 parts of 2-cyclohexylidene-cyclohexanone are recovered. The aqueous layer is evaporated at reduced pressure. The residue is recrystallised from a mixture of alcohol and ether. 120 parts of pure 2-cyclohexylidene-1-(3'-piperidinopropinyl)-cyclohexanol hydrochloride having the melting point 170° to 172° C. are obtained. The base is set free from the hydrochloride with alkali.

25 parts of this base are dissolved in 100 parts of tetrahydrofurane and hydrogenated with 200 atmospheres of hydrogen at about 80° C. after the addition of 2 parts of Raney-nickel. After filtering off the catalyst and evaporating the solvent, 25 parts of 2-cyclohexylidene-1-(3'-piperidino-propyl)-cyclohexanol are obtained from which the hydrochloride is prepared with aqueous hydrochloric acid or by leading dry hydrogen chloride into the original tetrahydrofurane solution. It melts at 205° to 206° C.

Example 2

35 parts of 1-diethylaminopropine-(2) are allowed to flow gradually while stirring at room temperature into a mixture of 300 parts of tetrahydrofurane, 80 parts of finely powdered potassium hydroxide and 35 parts of sodium methylate, the mixture thus warming up from 25° to about 35° C. 134 parts of 2-cyclohexylidene-cyclohexanone are then added to the mixture during the course of half an hour and the whole further stirred for 16 hours. 100 parts of water are added and the aqueous-alkaline layer is separated off. The organic solution is dried with caustic potash and the solvent evaporated, 12 parts of unreacted diethylamine distilling over with it. The residue (160 parts) is stirred with about 10 percent hydrochloric acid until the solution has an acid reaction to congo. The non-basic constituents are removed by extracting with ether three times. The aqueous acid solution is then made alkaline with strong caustic soda solution and the base extracted with ether. After evaporating the ether, 72 parts of crude 2-cyclohexylidene-1-(3'-diethylamino-propine)-cyclohexanol remain.

20 parts of this base are dissolved in 100 parts of absolute ether and 10 parts of methyl iodide are added. After some hours, a yellow precipitate is deposited and this is dissolved in a little alcohol and again precipitated with about 20 times the amount of absolute ether. Colourless crystals of the melting point 167° to 168° C. are obtained which are pure 2-cyclohexylidene-1-(3'-diethylaminopropinyl)-cyclohexanol-(1)-iodomethylate.

Example 3

To 25 parts of sodium wire covered with 1000 parts of dry ether, 150 parts of 3-pyrrolidinopropine are added while stirring. The mixture is heated to boiling under reflux for some hours. Then 180 parts of 2-cyclohexylidene-cyclohexanone are added and the whole is again heated to boiling for some hours. After cooling 250 parts of water are added, the ethereal layer is separated from the aqueous-alkaline layer, washed with water and the ether is distilled off after drying. There are obtained 150 parts of 2-cyclohexylidene-1-(3'-pyrrolidinopropinyl-)cyclohexanol which pass over at 150°–156° C. under a pressure of $10^{-3}$ torr. at a bath temperature of 210° C.

Example 4

In the manner described in Example 3 180 parts of 3-hexamethyleneiminopropine are reacted with 180 parts of 2-cyclohexylidenecyclohexanone and 25 parts of sodium. By further processing as described in Example 3 there are obtained 220 parts of 2-cyclohexylidene-1-(3'-hexamethyleneiminopropinyl-)-cyclohexanol which boils at 160°–163° C. under a pressure of $10^{-3}$ torr. at a bath temperature of 220°–230° C.

What we claim is:

1. A member of the group consisting of compounds having the formulae

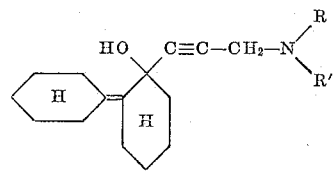

and

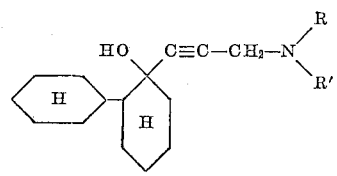

wherein R and R' are radicals selected from the class consisting of methyl and ethyl and —NRR' is a radical selected from the class consisting of pyrrolidino, piperidino, morpholino and hexamethylene-imino radicals.

2. 2 - cyclohexylidene - 1 - (3' - piperidinopropinyl)-cyclohexanol.

3. 2 - cyclohexylidene - 1 - (3' - diethylaminopropinyl)-cyclohexanol.

4. The hydrochloride of 2-cyclohexylidene-1-(3'-piperidino-propinyl)-cyclohexanol.

5. The methoiodide of 2-cyclohexylidene-1-(3'-diethylaminopropinyl)-cyclohexanol.

6. 2 - cyclohexylidene - 1 - (3' - pyrrolidinopropinyl-)cyclohexanol.

References Cited in the file of this patent

UNITED STATES PATENTS

| | | |
|---|---|---|
| 2,584,429 | Croxall | Feb. 5, 1952 |
| 2,590,638 | Miescher | Mar. 25, 1952 |